United States Patent
Wachtel

[15] 3,669,897
[45] June 13, 1972

[54] DIVALENT EUROPIUM ACTIVATED ALKALINE EARTH METAL SULFATES AND METHOD OF PREPARATION

[72] Inventor: Anselm Wachtel, Parlin, N.J.

[73] Assignee: Westinghouse Electric Corporation, Pittsburgh, Pa.

[22] Filed: Nov. 14, 1969

[21] Appl. No.: 876,765

[52] U.S. Cl. ...................................... 252/301.4 S, 23/122
[51] Int. Cl. .................................. C09k 1/22, C01f 11/46
[58] Field of Search ........................... 252/301.4 S; 23/122

[56] References Cited

UNITED STATES PATENTS

| | | | |
|---|---|---|---|
| 2,372,071 | 3/1945 | Fernberger | 252/301.4 S |
| 2,289,997 | 7/1942 | Renwick et al. | 252/301.4 S |
| 3,322,682 | 5/1967 | Thompson | 252/301.4 R |

FOREIGN PATENTS OR APPLICATIONS

| | | | |
|---|---|---|---|
| 1,161,871 | 8/1969 | Great Britain | 252/301.4 S |

OTHER PUBLICATIONS

Pringsheim, Fluorescence and Phosphorescence 1949 pages 478–479
Kroger, Some Aspects of the Luminescence of Solids, 1948 pages 291–292

*Primary Examiner*—Robert D. Edmonds
*Attorney*—A. T. Stratton, W. D. Palmer and W. Sutcliff

[57] ABSTRACT

Divalent europium activated alkaline earth metal sulfates wherein the metal is at least one of calcium, barium, or strontium, and europium is present in atom percent of the alkaline-earth metal of from about 0.4 to 7. The compositions emit very efficiently in the near-ultraviolet upon short wavelength ultraviolet excitation. A preferred mode of preparing the compositions is set forth whereby the composition is precipitated from solution.

4 Claims, 2 Drawing Figures

Spectral energy distributions of $Eu^{2+}$ activated alkaline earth sulfates

Plaque output of alkaline earth sulfates as a function of $Eu^{2+}$ concentration

DIVALENT EUROPIUM ACTIVATED ALKALINE EARTH METAL SULFATES AND METHOD OF PREPARATION

BACKGROUND OF THE INVENTION

Advances in the photocopying field which utilize near-ultraviolet energy in the reproduction process have sparked an investigation for phosphors which emit very efficiently in the near-ultraviolet. These phosphors are used with standard low pressure mercury vapor discharge devices in conjunction with the photocopying device. Calcium sulfate activated with divalent samarium is reported in "Nature," Vol. 142, page 256, 1938, wherein the investigator only reported on the well-known visible samarium emission.

SUMMARY OF THE INVENTION

It has been discoveried that alkaline earth metal sulfate composition $M_{(1-x)}SO_4:EU_x^{2+}$, wherein M is at least one of the alkaline-earth metals calcium, barium, strontium, and "$x$" is from 0.004 to 0.07 are very efficient near-ultraviolet emitters when excited by short wavelength ultraviolet energy such as is generated in a low pressure mercury vapor discharge device. The emission from each alkaline-earth metal species is in a fairly narrow band, with the calcium species having a peak emission of about 387 nanometers and a half-width of about 17 nanometers, while the barium and strontium species each peak at about 377 nanometers with half-widths of about 25 nanometers.

It has been discovered that the luminescent, very well crystallized composition of the present invention is preferably prepared by a precipitation process. A predetermined amount of sulfate radical containing solution is added to an alkaline-earth metal ion and divalent europium ion containing solution, while maintaining the resulting mixture at a temperature of from about 70° C up to the boiling point of the resulting mixture, whereby europium activated alkaline-earth metal sulfate is precipitated. The precipitate is then readily filtered from the solution. The luminescent composition can be further improved by firing the composition with or without alkaline-earth metal chloride flux.

DESCRIPTION OF THE PREFERRED EMBODIMENT

Figure 1:
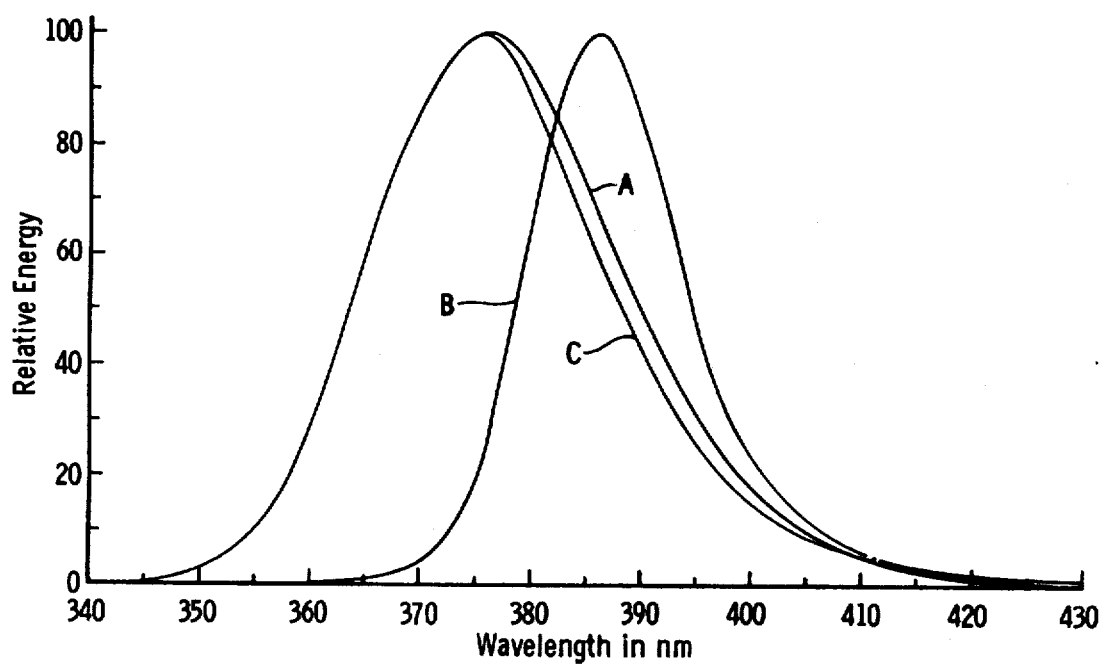
FIG. 1 is a plot of the spectral energy distribution of individual sulfate species with relative energy output plotted against wavelength in nanometers with excitation by 254 nanometer radiation.
Figure 2:
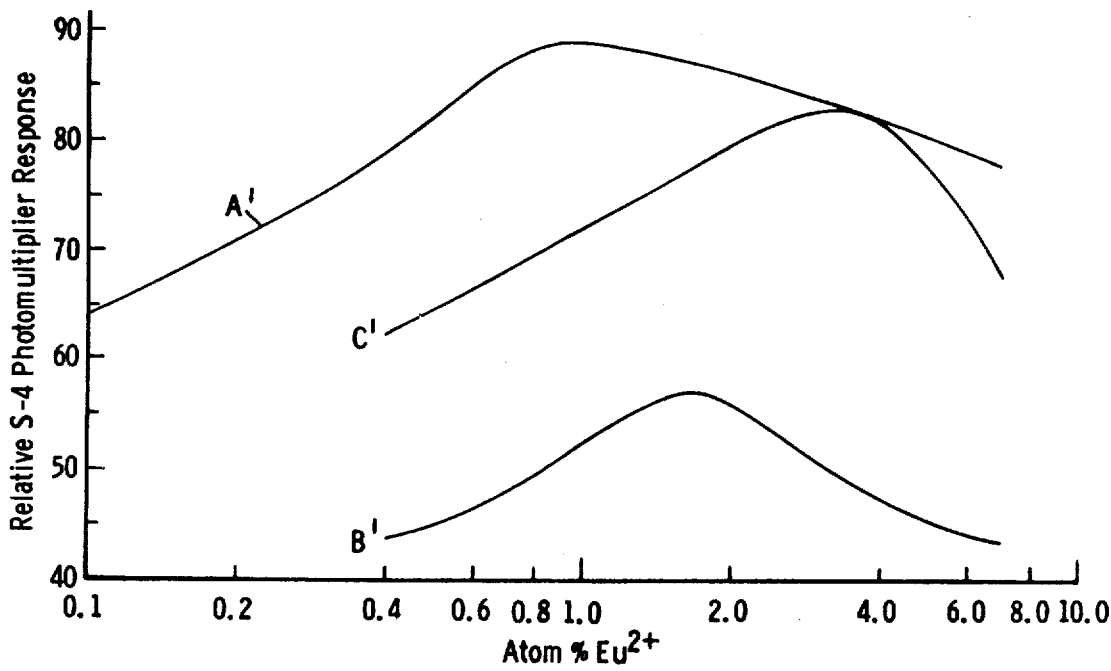
FIG. 2 shows the effect of europium content for each species by plotting relative light output versus atom percent of europium with respect to total metal, i.e. alkaline-earth metal plus europium.

The phosphor compositions of the present invention are preferably prepared by first precipitating the europium and alkaline-earth metal sulfate. As an example of this process, 50 milliliters of an 0.5 molar strontium chloride solution containing about 1 milliliter of concentrated hydrochloric acid solution, which is about 30 percent by weight hydrochloric acid, is heated to about 100° C with constant stirring while the container is flushed with a current of nitrogen gas. To this is added about 0.4 gram of divalent europium carbonate ($EuCO_3$) which is suspended or dissolved in a few milliliters of distilled water, after which about 50 milliliters of 0.5 molar $(NH_4)_2SO_4$ is added over a period of about 10 minutes, with constant stirring and heating to maintain the solution at about 100° C for an additional 10 minutes to effect the aging of the precipitate. The precipitate is then filtered, washed with distilled water and thereafter with alcohol and dried. The precipitate is already strongly luminescent under excitation by 254 nanometer radiation, but this luminescence is further enhanced by heating the composition for about 1 hour at 1,000° centigrade in a dry nitrogen or other such inert atmosphere. The spectral energy distribution which this strontium sulfate composition exhibits under 254 nanometer excitation is seen as curve A in FIG. 1. A further improvement in luminescent output can be had by adding up to about 20 mole percent strontium chloride flux to the precipitated strontium sulfate before firing, in which case the fired product is leached with distilled water, filtered, washed, and dried before usage. The calcium sulfate species and barium sulfate species or mixed alkaline-earth metal sulfates are prepared in the manner described above substituting only the appropriate metal chloride for the strontium chloride, or a portion of same, in the precipitating solution, and varying the amount of europium carbonate in accordance with the observed maximum output for each species as shown in FIG. 2 wherein curves A', B', and C' are for the strontium, calcium, and barium species respectively. The spectral energy distribution under 254 nm. excitation for the calcium species is shown as curve B of FIG. 1, and the barium species by curve C of FIG. 1. For mixtures of alkaline-earth metals the emission peaks will be shifted dependent on the relative metal atom ratios. In preparing the calcium sulfate species the firing temperature should be limited to about 900° Centigrade in order to avoid excessive crystallization, and if a calcium chloride flux is used during the firing process no more than about 2 to 3 mole percent should be added to prevent excessive crystal growth.

The quantum efficiencies attained for each of the alkaline-earth metal species is very high and the compositions are not adversely affected when lehred during lamp manufacture.

In precipitating the sulfates the molarities of the sulfate radical containing solution and the alkaline-earth metal solution can be varied widely from about 0.1 to about 2 molar. The ratio of sulfate radical to total metal ions in the resulting mixture is to be at least one, and it is also desirable to provide an excess of sulfate radical over the total metal ions of up to about 20 mol percent.

The rate of addition should be slow enough to insure formation of crystals of appropriate size for fluorescent lamp usage. For the small batch size in the example the sulfate containing solution is preferably added at from 5–20 milliliters per minute.

The resulting mixture should be maintained at from about 70°C up to the boiling point of the admixed solution to insure adequate crystal growth of the precipitate.

While the precipitated sulfate is already strongly luminescent under ultraviolet excitation a firing increases the luminescence. The firing temperature can be widely varied from about 750° to 1300° C. When the alkaline-earth metal chloride fluxes are added the firing temperature lower limit is the melting point of the flux, while the upper limit is the point at which the sulfates will decompose. The firing time is dependent on the temperature with the higher the temperature the shorter the firing time.

An non-oxidizing firing atmosphere is required to maintain the europium in the divalent state. The atmosphere should also be non-reducing so as to avoid formation of alkaline-earth sulfides.

The compositions of the present invention upon cathode-ray excitation exhibit an intensity of emission comparable to commercial cathode-ray tube phosphors.

I claim:

1. The method of preparing the luminescent composition $M_{(1-x)}SO:Eu_x^{+2}$, wherein M is at least one of the alkaline-earth metals barium, or strontium, and $x$ is from 0.004 to 0.07, which method comprises;
   a. adding a predetermined amount of sulfate radical containing solution to a solution containing predetermined amounts of alkaline-earth metal ions and divalent europium ions, with the ratio of sulfate radicals to total metal ions being at least one, and maintaining the resulting mixture at a temperature of from about 70° C to the boiling point of the resulting mixture, whereby europium activated alkaline-earth metal sulfate is precipitated;
   b. separating the resulting precipitate from the mixture;

c. mixing up to about 20mol percent of barium and/or strontium chloride as flux with the precipitate, with the ratio of barium chloride to strontium chloride being the same as the ratio of barium sulfate to strontium sulfate; and d. firing the mixture.

2. The method as specified in claim 1, wherein the mixture is fired at from about 750° to 1,300° C for at least one-half hour in an inert atmosphere.

3. The method of preparing the luminescent composition $Ca_{(1-x)}SO_4:Eu_x^{+2}$, wherein $x$ is from 0.004 to 0.07, which method comprises;

a. adding a predetermined amount of sulfate radical containing solution to a solution containing predetermined amounts of calcium ions and divalent europium ions, with the ratio of sulfate radicals to total metal ions being at least one, and maintaining the resulting mixture at a temperature of from about 70° C to the boiling point of the resulting mixture, whereby europium activated calcium sulfate is precipitated;

b. separating the resulting precipitate from the mixture;

c. mixing up to about 3 mol percent of calcium chloride as flux with the precipitate; and d. firing the mixture.

4. The method as specified in claim 3, wherein the mixture is fired at from about 750° to 900° C for at least 1 hour in an inert atmosphere.

* * * * *